United States Patent [19]

Gutsch

[11] Patent Number: 4,512,705
[45] Date of Patent: Apr. 23, 1985

[54] HORIZONTAL PLOW SYSTEM METHOD AND APPARATUS FOR RECLAIMING AND HOMOGENOUSLY BLENDING BULK SOLID PARTICULATE MATTER SUCH AS COAL

[76] Inventor: James L. Gutsch, 14909 W. 84th Ter., Lenexa, Kans. 66215

[21] Appl. No.: 495,523

[22] Filed: May 17, 1983

[51] Int. Cl.³ .......................................... B65G 65/38
[52] U.S. Cl. ..................... 414/327; 198/550; 198/561; 198/730; 414/268; 414/272; 414/786
[58] Field of Search ............. 414/304, 325, 327, 133, 414/144; 198/730, 733, 561, 533, 550, 616; 222/135, 145, 408

[56] References Cited

U.S. PATENT DOCUMENTS

| 677,677 | 7/1901 | Messiter | 414/133 X |
|---|---|---|---|
| 1,215,739 | 2/1917 | Stehli | 198/573 X |
| 1,571,536 | 2/1926 | Wilson | 198/733 |
| 1,682,872 | 9/1928 | Venable | 414/21 |
| 2,007,874 | 7/1935 | Redler | 198/363 |
| 2,156,878 | 5/1939 | De Los Sinden | 198/730 |
| 2,699,249 | 1/1955 | Milliken, Jr. et al. | 198/561 X |
| 2,748,993 | 6/1956 | Forrest | 198/550 X |
| 2,756,869 | 7/1956 | Merck et al. | 198/731 |
| 2,982,445 | 5/1961 | Koble | 222/135 X |
| 3,194,384 | 7/1965 | Beul | 198/543 X |
| 3,314,557 | 4/1957 | Sackett, Sr. | 414/268 X |
| 3,441,149 | 4/1969 | Svoboda | 198/550 X |
| 3,622,018 | 11/1971 | Morris | 414/268 |
| 4,179,234 | 12/1979 | Young | 414/133 X |
| 4,222,498 | 9/1980 | Brock | 222/135 X |
| 4,250,987 | 2/1981 | Trammell et al. | 198/561 X |

FOREIGN PATENT DOCUMENTS 661203  7/1929  France ................... 222/135

Primary Examiner—Joseph E. Valenza
Assistant Examiner—Stuart J. Millman
Attorney, Agent, or Firm—Roy E. Mattern, Jr.

[57] ABSTRACT

A horizontal plow system method and apparatus has been developed for the homogenous blending and reclaiming of bulk solid particulate matter, such as coal, at a utility plant. The horizontal plow system apparatus comprises one or more displacement assemblies, each further comprising a receiving stationary top plate and a horizontal flight subassembly. Coal is deposited via gravitational forces from an elongated slot bin storage onto the receiving stationary top plate and is then pushed on a bias and ultimately displaced by angular flights during travel of the horizontal flight subassembly along the receiving stationary top plate. Operation of the displacement assembly serves to displace the bulk solid from the sides of the receiving stationary top plate such that portions of coal from along the entire length of the elongated slot bin storage are continuously and simultaneously falling onto a moving transfer belt below, thereby insuring a more even blending of the coal. The transfer belt then moves the coal to the site of a downstream process. A sealing skirt structure provides support for the horizontal receiving stationary top plates as well as provides an enclosure to contain the coal and control dust. Adapted for rotational travel about the ends of the receiving stationary top plates, the angular flights depend rearwardly from opposite sides of forked members of the endless chain at an angle which permits the coal biased movement along the facing of the angular flights as well as sliding upon itself to be ultimately displaced from the sides of the receiving stationary top plate during longitudinal movement of the horizontal flight subassembly.

19 Claims, 10 Drawing Figures

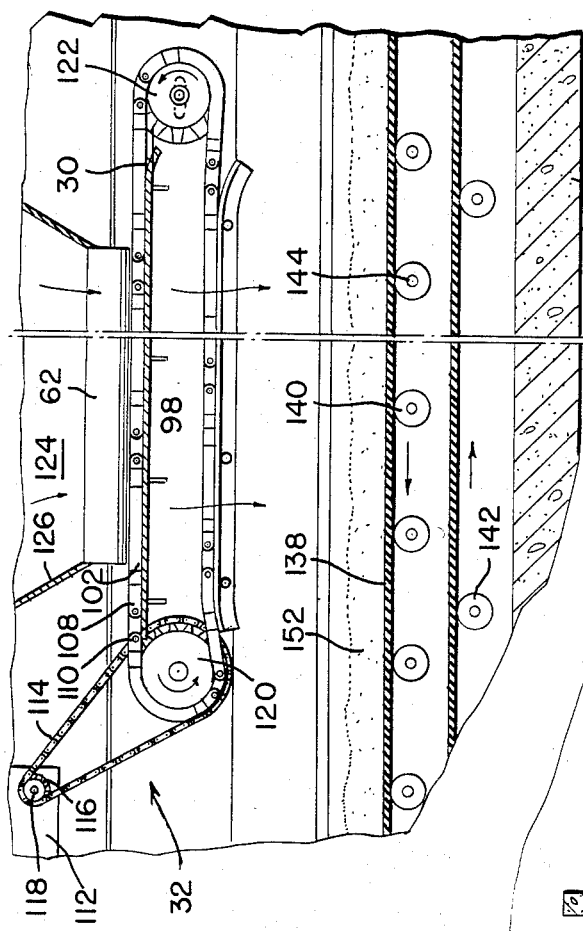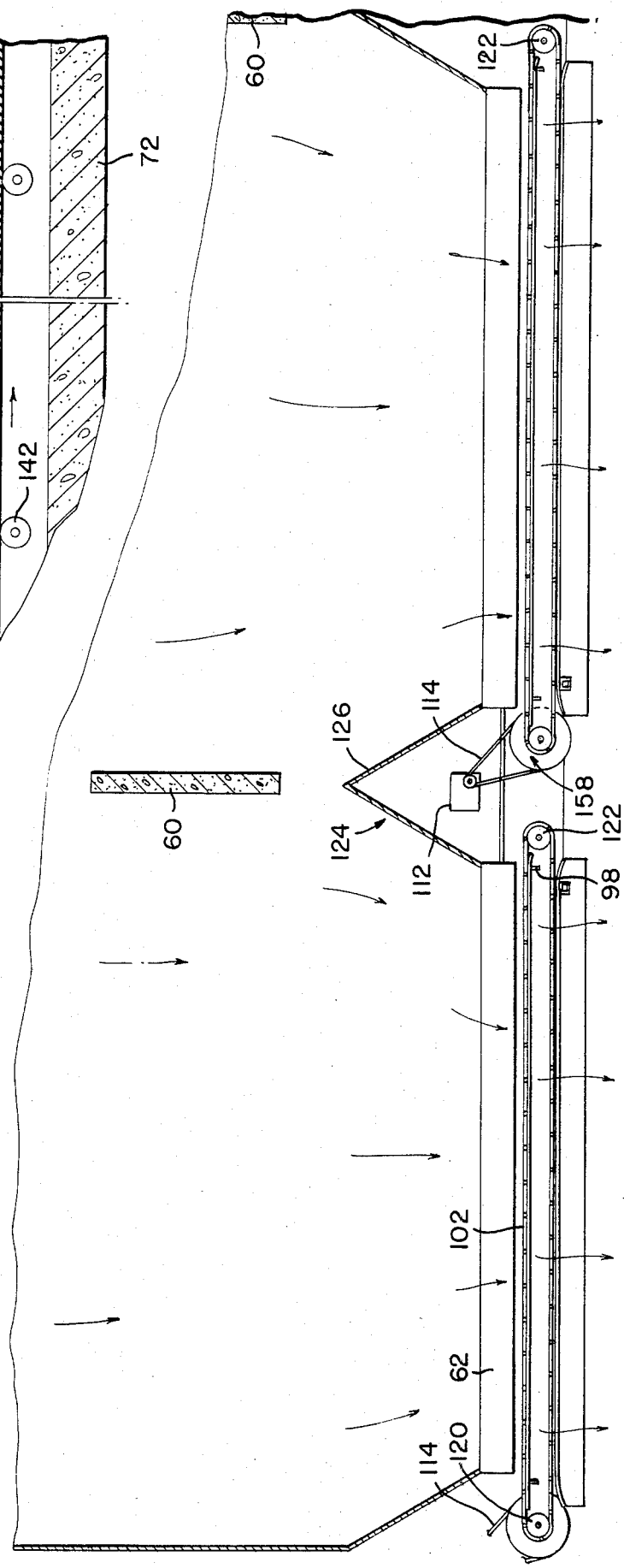

HORIZONTAL PLOW SYSTEM METHOD AND APPARATUS FOR RECLAIMING AND HOMOGENOUSLY BLENDING BULK SOLID PARTICULATE MATTER SUCH AS COAL

BACKGROUND OF THE INVENTION

Coal Handling at a Plant Site

The process of handling coal at a plant site is essentially concerned with several operations including receiving, unloading, measuring, stacking, storing, reclaiming, blending and ultimately transferring the material to the downstream process or eventual user location, such as a utility furnace or export terminal. The present invention provides and is primarily concerned with a method and apparatus for improved blending of bulk solid particulate material, such as coal, varying in chemical and physical composition including particle size and sulfur content and which may come from multiple mining sources. This blending is accomplished generally by a system in which coal having various chemical and physical properties is simultaneously and continuously recovered from live storage and displaced from planar surfaces to then fall onto a conveying means and accumulate in progressively increasing layers prior to being transported to the site of a downstream process. More detail of the horizontal plow system will be discussed later.

Modern power plants handling coal can take care of all the necessary processes from delivery of the raw material to the ultimate delivery to the utility furnace. Handling costs and environmental concerns have practically necessitated this all encompassing operation at the utility sites.

Focusing on the two main elements of this invention, blending and reclaiming, there are many advantages to performing these operations at the site. To eliminate the redundancy of equipment, coal can be loaded into storage facilities which will make it directly accessible to blending and transport means which will convey the coal to the plant furnace. This so-called "live" storage eliminates multiple transfers from inactive or "dead" storage sites.

Blending Coal at the Plant Site

More and more, plant site blending is becoming increasingly used. By its nature, coal is a very heterogeneous, perverse substance. Variations in sulfur, moisture and ash content as well as particle size and calorific value occur between loads brought from the various mining areas as well as within the individual loads. Many times shipments arrive at a site containing loads from many different locations and mined over a several week period. Repeated handling also causes particles within the shipments to segregate by size. To meet the requirements of the various plant facilities, a homogenous blending for specific chemical and physical variations is required. One reason for blending at the plant site is to reduce sulfur dioxide smoke stack emissions to the EPA established level. Blending to achieve an even mix of the proper grade sulfur content coal prior to use will help eliminate fluctuations that result during the handling and storage. Blending can also provide a less expensive alternative to scrubbing the coal.

Objectives and Features of the Present Invention

A main objective of the present invention is to provide an improved method and apparatus for the controlled blending of bulk solid particulate material, and coal in particular, reclaimed from multiple sources or having chemical and physical variation, during the reclaiming process. Another objective is to provide an improved apparatus and method of reclaiming (large volumes of) bulk solid material to be transferred to a user location or downstream process which principally requires a prescribed ratio of feed of homogenously blended material while minimizing degradation. This system is designed to reclaim portions of coal having these varying properties from multiple car lots simultaneously, rather than individually. At any one time, while the system is in operation, coal from each of the various car loads or contiguous bands is simultaneously and continuously being deposited from storage to thereafter fall down onto planar surfaces and to then be displaced from the planar surfaces to then fall down onto a moving conveyor or transfer means from along the entire length of the storage facility rather than being extracted from isolated segments of the storage facility separately.

In general with regard to the preferred embodiments of Mr. Gutsch's Horizontal Plow System, a horizontal flight subassembly is adaptably supported by a receiving stationary top plate for slidable, longitudinal revolution about the receiving stationary top plate. The horizontal flight subassembly and supporting receiving stationary top plate comprise a displacement assembly whereby one or more displacement assemblies are positioned in longitudinal alignment beneath a longitudinal discharge opening in the bottom of an elongated slot bin storage, to receive coal from various car lots having chemical and physical variations between and within each lot which are contained in sloping contiguous bands or mounds. As the coal falls onto the planar surface of the receiving stationary top plate, having fallen through the longitudinal discharge opening via gravitational forces, the horizontal flight subassembly, comprising depending angular flights, is slidingly traversed along the planar surface of the receiving stationary top plate during operation of the horizontal plow system, pushing the coal on a bias along the planar surface of the receiving stationary top plate and ultimately displacing the coal from the sides of the receiving stationary top plate to thereafter fall down onto a moving transfer belt below.

Despite the many inventions pertaining to conveying and blending bulk solid material, there remained a need for an improved method of obtaining a homogenous blend of various sources and grades of coal and other minerals as well as an apparatus to facilitate blending during the reclaiming process. In contrast, the conveyors disclosed by Arnold Redler's patent (infra) as well as the numerous chain conveyor systems operate primarily as transport means with Redler's invention serving more to combine and add different grades of coal together during reclamation rather than homogenously blend variations in physical and chemical composition between and within the various grades of coal. There also remained a need to provide a blending and reclaiming system which would minimize the use of redundant equipment as well as unnecessary or repeated steps or operations in the reclaiming process, such as is necessary with Young's blending apparatus.

Current Methods of Blending, Reclaiming and Storing Coal

Live stockpiling of coal, active storage in which the coal is directly reclaimed for use on the plate site, as opposed to off the site storage, is provided in several types of structures, including silos, slot bins, tunnel conveyors or a combination of several of these in both open and covered storage facilities.

Many recent developments have focused on the process of reclaiming coal and other bulk solids such as grain or other minerals from live stockpile storage.

Numerous companies have developed a single strand link chain with transversely positioned horizontal drag flight members to transfer bulk solid material from point to point. Comprising assemblies of endless chains, fully enclosed within a structure, these conveyors operate primarily as volumetric systems, transferring material in a solid stream from one location to another.

Funnel and massed flow bin storages are described in an article entitled "Feeding" by Jerry Johanson, *Chemical Engineering Deskbook*, Oct. 13, 1969. These methods of reclaiming coal simply permit gravitational discharge through the bottom of the storage facility onto a transfer belt or other transfer means upon operating a gate or valving mechanism. When used with this type of system, the perverse nature of coal, especially when wet, will often hamper its flowability, resulting in arches being formed within the storage facility and interrupted flow. The difficulty in controlling and regulating the flow of discharged material with a gate often necessitates the use of additional equipment during the reclaiming process.

In his U.S. Pat. No. 2,007,874, Arnold Redler discloses a conveyor which blends and discharges flowable material, withdrawn from separate sources, through a single discharge opening and which utilizes an endless chain having horizontal cross bar members. Utilizing the drag chain flight assembly, the material is simply transferred enmasse to the downstream process via a conveyor system. While Redler provides for blending or more accurately combining of material from multiple sources, homogenizing for physical and chemical variations, especially within individual lots, is quite limited. Utilizing individual hoppers having restricted flow capabilities, in combination with the straight conveyor system, a limited volume of coal may be blended and reclaimed. Such hoppers similar to the drawoff-type of inlet, are demonstrated in Redler's patent, often inhibit balanced and homogenous flow of material onto the reclaiming machinery. Moreover, the straight bladed flight chain, designed for transferring rather than displacing bulk material, is severely limited as to the volume of coal which can be handled. In contrast, the slot bin combined with the displacement reclaiming system increases the volume of reclaimed bulk material as well as the homogenous blending capabilities.

Other means for reclaiming bulk solid material from live storage include the rotary plow in which a device having rotating blades travels beneath a storage facility, displacing the material in the storage facility from the top of a planar surface or shelf. Essentially used with elongated slot storages, the rotary plow extracts material from only one layer or one small area of the entire storage facility at any one time and must travel repeatedly back and forth along the storage opening to reclaim material from within the entire storage facility. Thus with this system, blending two kinds of coal is possible only if multiple bins or car loads of coal are in line and two or more rotary plow reclaiming feeders are working on one reclaim conveyor.

William Young, U.S. Pat. No. 4,179,234, discloses an apparatus and method for blending flowable solid materials which incorporates a rotary plow. Portions of coal are individually extracted from the layers in the storage facility by the rotary plow and are redeposited into the slot storage in progressively smaller amounts such that the layers become progressively narrower. Thus coal from several layers may be reclaimed simultaneously by the blades of the rotary plow as the layers become sufficiently narrower.

First patented in West Germany in 1922 by Bachau-Wolf Company, the rotary plow has become a primary means for reclaiming and feeding bulk solid material from storage facilities in which blending was sought as a byproduct. The rotary plow system has been manufactured by several companies, including Marathon Steel Company of Phoenix, Ariz. Despite its limitations and drawbacks, it remains a primary means for reclaiming from elongated and bin storage facilities.

Other methods and devices have been developed for blending and feeding coal during the reclaiming process including table feeders and the vibratory feeder, such as the "Un-Coaler" Activator/Feeder of the General Kinematics Company of Barrington, Ill.

SUMMARY OF THE INVENTION

With respect to the prior art, the Applicant provides a horizontal plow system including a comparatively lower cost apparatus and an improved method for reclaiming and homogenously blending bulk solid particulate matter, such as coal, which is stacked and contained within a live storage facility, such as an elongated slot bin storage, at a utility plant, prior to being transferred to the site of a downstream process at the utility plant. Centering on the use of one or more displacement assemblies, the horizontal plow system permits multiple car lots of coal, having various chemical and physical properties, to be simultaneously and continuously reclaimed and homogenously blended along the entire length of the elongated slot bin storage at the prescribed rate of feed while minimizing the degradation of the coal and permitting uniformity in density and particle size distribution of the mixture of coal. Comprising a receiving stationary top plate and a horizontal flight subassembly, each of the displacement assemblies are positioned end to end beneath the longitudinal discharge opening of the elongated slot bin storage. Coal, previously stacked and stored in the elongated slot bin storage flows via gravitational forces through the longitudinal discharge opening to thereafter fall down on to the receiving stationary top plate, where it is retained until being demanded, for example, as fuel for a utility furnace. Upon continuing demand, the coal is displaced from the sides of the receiving stationary top plates of the displacement assemblies via slidingly longitudinal travel of the horizontal flight subassemblies on the receiving stationary top plates and more specifically by the forces imparted by angular flights which are spaced apart and depend from an endless chain, comprising each horizontal flight subassembly. The horizontal plow system is adapted for use with a moving transfer belt which moves in longitudinal horizontal travel beneath the receiving stationary top plates along the entire length of the elongated slot bin storage to receive the coal which has been displaced from the receiving stationary top plates above. During travel from one end of the longitudinal discharge opening to the other, the moving transfer belt receives a progressively increasing layering of portions of coal which have fallen from the sides of the receiving stationary top plates until, having completed traveling the entire distance beneath the longitudinal discharge opening, the moving transfer belt contains layers of now homogenously blended and layered coal reclaimed from each of the multiple car lots from within the entire length of the elongated slot bin storage, which may now be transferred to the site of the downstream process. Independent operating controls permit individual horizontal flight subassemblies to remain motionless during the operation of the horizontal plow system apparatus, thereby allowing selective reclaiming and homogenous blending of coal from particular sections of the elongated slot bin storage. Variable operating speeds of the horizontal flight subassemblies may alter the volume of coal displaced from the receiving stationary top plate of each displacement assembly per unit of time during operation of the horizontal plow system, thereby permitting regulation of the proportional amounts of coal from each receiving stationary top plate to the total volume of coal being homogenously blended during operation of the horizontal plow system. Variable operating speeds of the travel of the transfer belt during operation of the horizontal plow system allow the proportions of coal reclaimed from each car lot and the desired blend as well as the total volume of coal reclaimed and homogenously blended to be controlled.

The horizontal plow system may be adapted for use with other bulk solid particulate matter, such as grain or other minerals. Among the requisite changes necessary to adapt the system include the pitch of the angular flights of the horizontal flight subassemblies, for example, which may be adjusted to meet the flow characteristics and other physical properties of the matter being reclaimed and homogenously blended.

DESCRIPTION OF THE DRAWINGS

FIG. 4 is an enlarged side view illustrating two displacement assemblies with flow arrows indicating the direction of flow of coal from the elongated slot bin storage down onto the planar surfaces to thereafter be displaced from the sides of the receiving stationary top plates, and then fall onto the moving transfer belt.

FIG. 5 is an enlarged sectional view of FIG. 4 illustrating sections of opposite ends of a displacement assembly and the moving transfer belt below each section. Flow arrows again indicate the direction of flow of coal. Arrows also indicate the direction of travel of the moving transfer belt.

DESCRIPTION OF THE PREFERRED EMBODIMENTS

Figure 1:
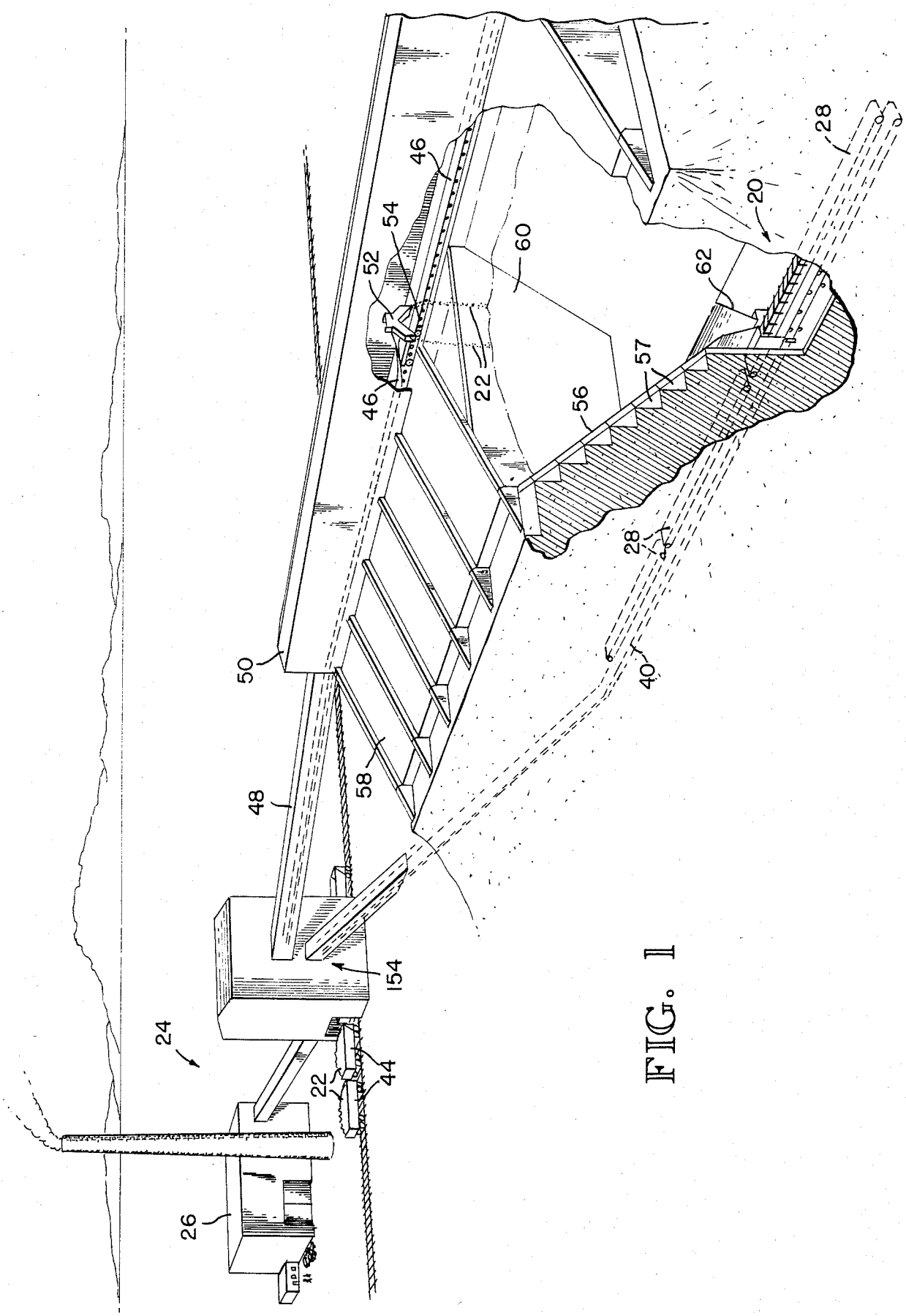
FIG. 1 is a perspective view of a novel plant site utilizing the horizontal plow system, including, partially in phantom, the moving transfer belt. The elongated slot bin storage is partially broken away for clarity of detail.

The Essentials of the Horizontal Plow System Apparatus for Reclaiming and Homogenously Blending Bulk Solid Particulate Matter, Such as Coal, at a Plant Site A horizontal plow system apparatus 20 is designed and specified to operate within a live storage facility at an industrial or utility plant 24, reclaiming and homogenously blending bulk solid particulate matter such as coal 22, prior to the coal 22 being transferred to a site of a downstream process, to be utilized, for example, as the heat source in a furnace 26 of a power generating utility plant 24.

In a preferred embodiment, the horizontal plow system apparatus 20 comprises one or more displacement assemblies 28, each of which further comprises a receiving stationary top plate 30 and a horizontal flight subassembly 32. The receiving stationary top plates are positioned beneath a longitudinal discharge opening 34 of an elongated slot bin storage 36 which serves as the live storage facility, to receive coal 22 upon demand, which was previously deposited from the elongated slot bin storage 36 above. The coal 22 on the receiving stationary top plates 30, upon continuing demand, is then pushed on a bias for transverse movement during the longitudinal movement of the horizontal flight subassemblies 32, to be ultimately displaced, i.e. dropped, from the sides 38 of the receiving stationary top plates 30, to thereafter fall down onto a moving transfer belt 40, adapted for longitudinal, horizontal travel beneath the receiving stationary top plates 30, which then transports the now homogenously blended and layered coal 152 to the selected downstream process.

A Specific Environment of the Horizontal Plow System Apparatus

With respect to FIG. 1 of the drawings, the horizontal plow system apparatus 20 is adapted to be positioned beneath the longitudinal discharge opening 34 of the elongated slot bin storage 36 and above the moving transfer belt 40. Coal 22 is delivered to the terminal area 42 at the utility plant 24, such as by railroad car 44 where the coal is unloaded from the railroad car 44 and fed by a continuous conveyor 46 through a chute 48 and into a galley 50, which protects the coal from the weather. In the gallery 50 a tripper 52, guided along tracks 54, selectively at various changing locations removes the coal from the continuous conveyor 46, thereby discharging the coal 22 into the elongated slot bin storage 36. Thereafter, when homogenously blended bulk solid particulate matter, i.e. the coal 22 is needed by the utility plant 24, the horizontal plow system apparatus 20 is operated. During such operation, the coal 22 is reclaimed from the elongated slot bin storage 36, in a selective way to obtain the homogenous blending before being transported to a downstream process at the utility plant 24.

A roof structure 58 may cover the elongated slot bin storage 36 to protect the stored coal from the elements, as well as mountably support the gallery 50.

The Horizontal Plow System Apparatus May be Adapted for Use With Existing Equipment as Well as Constructed With New Plant Site Equipment This horizontal plow system apparatus 20, shown in FIG. 1 in the specific environment, may be adapted for use with various other types of existing storage facilities, such as silos, bins, open stockpiles or bunkers, as well as with various other kinds of transfer equipment. While the preferred embodiment, shown in FIGS. 1 through 10 is adapted to displace the coal onto an endless transfer conveyor, the horizontal plow system may also be adapted for use with various types of other conveyors such as chain flights, all of which may be used to transport the now homogenously blended coal 152 to a selected downstream process.

The Elongated Slot Bin Storage Serving as a Typical Live Storage Facility

Figure 2:
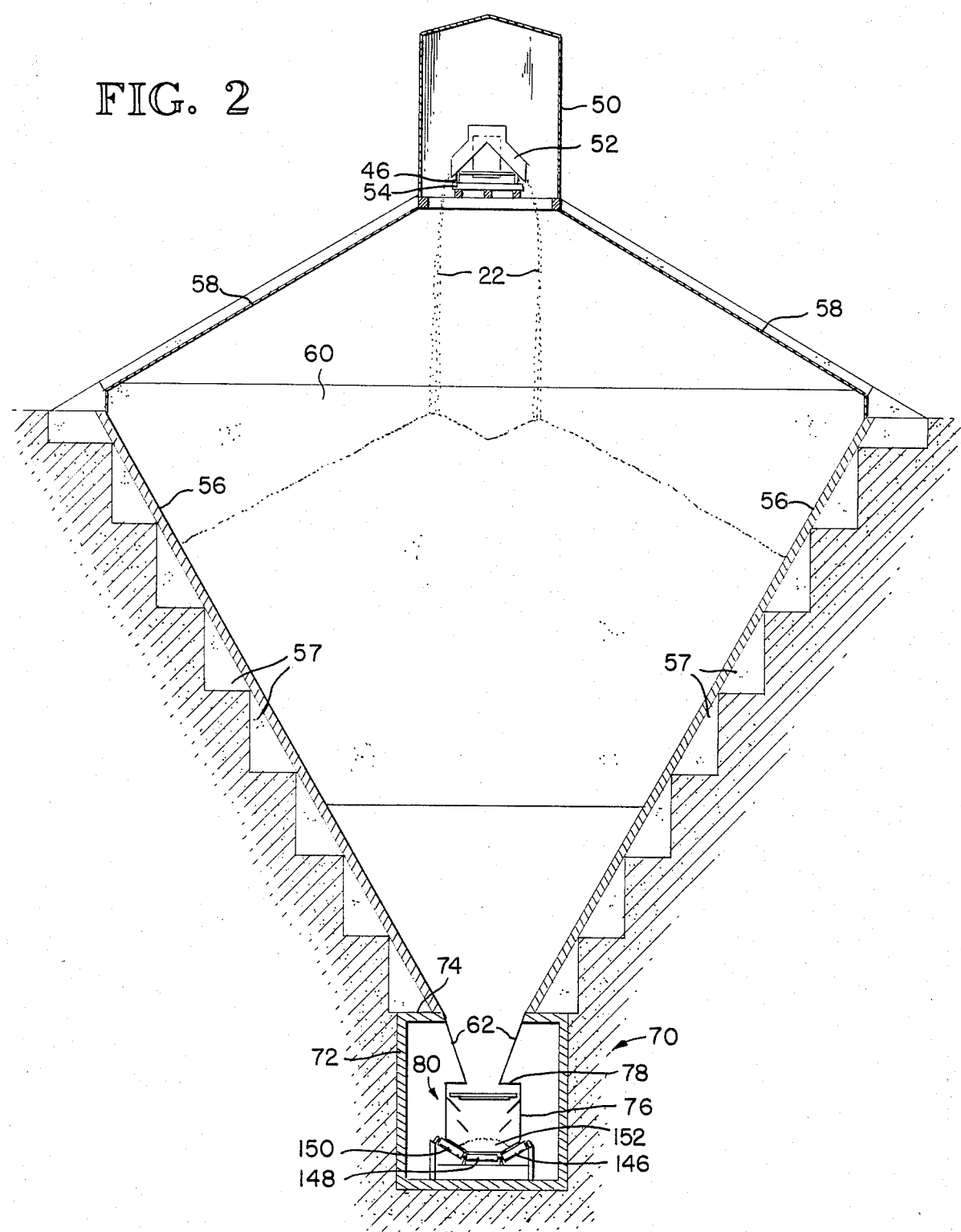
FIG. 2 is an end view of the horizontal plow system apparatus including the tunnel and the elongated slot bin storage.

The preferred embodiment of the horizontal plow system apparatus 20, as illustrated in FIGS. 1 through 4 and 6, is adapted for use with an elongated slot bin storage 36, serving as the live storage facility, having sloping and converging walls 56, which may be made of precast concrete panels 57 as illustrated in FIGS. 1 and 2, and a centrally located longitudinal discharge opening 34 at the bottom. The pitch of the sloping and converging walls 56 is preferably 60 degrees relative to horizontal with regard to the flow characteristics and reclaiming of coal and to facilitate the flow of the coal 22 via gravitational forces through the longitudinal discharge opening 34. Other material including steel may be used for the sloping and converging walls 56. The elongated slot bin storage 36 is covered by a roof structure 58.

Spaced apart within the elongated slot bin storage 36, transversely positioned section dividers 60 extend between the sloping and converging walls 56 to partially separate the deposited car lots of coal. Section dividers 60 preferably extend only across the middle portion of the elongated slot bin storage 36, leaving an open flow area at the top and bottom of the elongated slot bin storage 36.

Extending below the bottom of the elongated slot bin storage 36 is a tapered gathering hopper 62, secured to the bottom of the sloping and coverging walls 56 by brackets 64. The tapered gathering hopper 62, extending longitudinally for the entire length of the elongated slot bin storage 36, provides an extension of the sloping and converging walls 56 and forms a longitudinal discharge opening 34 at its bottom edges 66 as shown in FIGS. 1, 2, 6 and 7.

Figure 3:
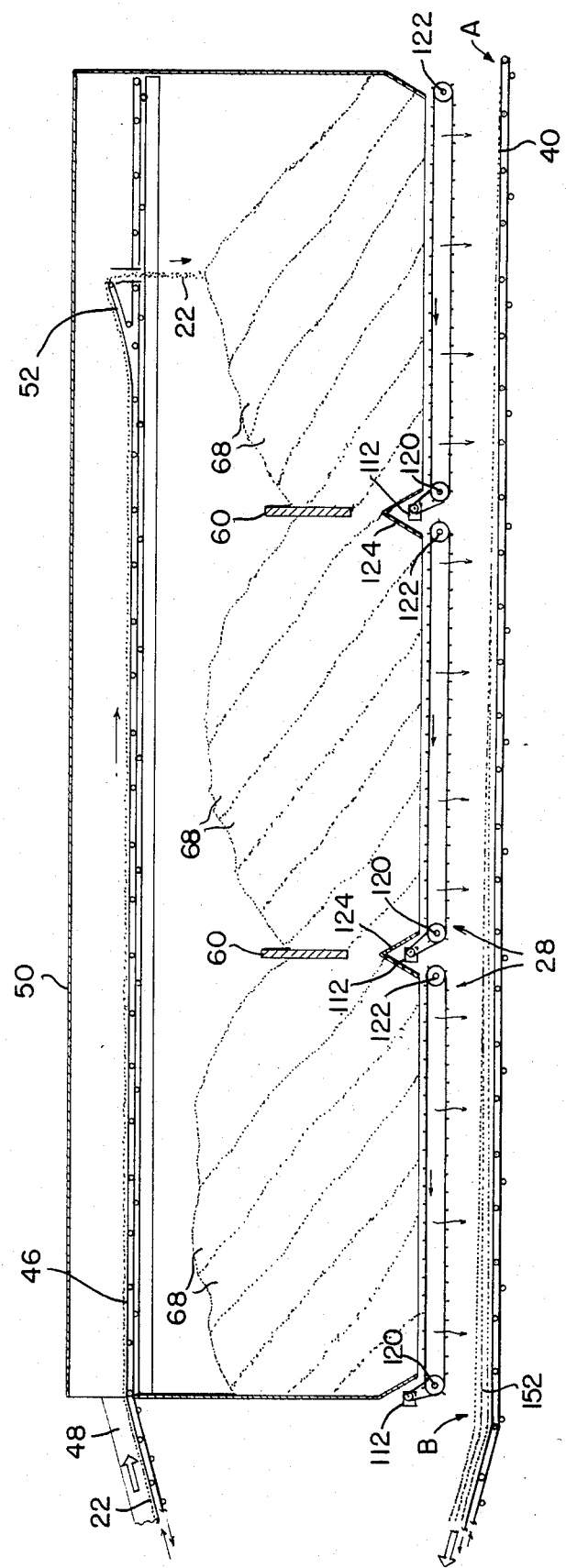
FIG. 3 is a side view of the horizontal plow system apparatus illustrating the multiple displacement assemblies and the resulting progressively increasing layers of homogenously blended coal on the moving transfer belt.

As the coal 22 is deposited by the tripper 52 while traveling above the elongated slot bin storage 36, it is stacked and contained in generally sloping contiguous bands 68 or mounds between the section dividers 60 along the entire length of elongated slot bin storage 36 as shown in FIG. 3.

A Tunnel Typically Provides a Lower Extension of the Elongated Slot Bin Storage, Providing Structural Support for the Sloping and Converging Walls and Surrounds the Horizontal Plow System Apparatus and Moving Transfer Belt A tunnel 70 is typically used in conjunction with bin storage facilities to provide a support base for the storage as well as a housing structure for reclaiming equipment. The tunnel 70 comprising vertical walls 72 and partial roof members 74, and a base 75, extends beneath the elongated slot bin storage 36 in alignment with the longitudinal discharge opening 34 to provide structural support for the sloping and converging walls 56 and house the horizontal plow system apparatus 20 and moving transfer belt 40.

The Horizontal Plow System Apparatus Centers on the Use of One or More Displacement Assemblies The horizontal plow system apparatus 20 comprises one or more displacement assemblies 28 which are central to the reclaiming and blending operations of the invention. The displacement assembly 28 further comprises a receiving stationary top plate 30 which adaptively supports a horizontal flight subassembly 32. Generally a plurality of displacement assemblies 28, shown in FIGS. 1 and 3, are used with the horizontal plow system apparatus 20, depending on the volume of coal 22 to be handled, so as to be able to reclaim and homogeneously blend coal from the entire length of the elongated slot bin storage 36 simultaneously. The displacement assemblies 28 are adaptively positioned end to end within the tunnel 70 beneath the longitudinal discharge opening 34 and along its entire length, to receive the coal 22 which was previously deposited from the elongated slot bin storage 36 overhead and to ultimately displace the coal off of the sides of the receiving stationary top plate 30 to thereafter fall down onto the moving transfer belt 40 below.

The components of the displacement assemblies 28, to be described more fully in due course, generally comprise a receiving stationary top plate 30, a horizontal flight subassembly 32 which is adaptively supported by the receiving stationary top plate 30, a drive means for the horizontal flight subassembly 32 and a support means.

Independent operational and speed controls for the horizontal flight subassemblies 32 permit the displacement assemblies 28 to be operated singly or in combination with each other, depending on the volume of coal 22 contained within the elongated slot bin storage 36 to be reclaimed as well as the prescribed rate of feed required by the utility plant 24.

Variable speeds of operation of the horizontal flight subassemblies 32 also permit the volume of coal received and then displaced by each displacement assembly 28 to be regulated proportionally to the total amount of coal reclaimed as well as to determine the proper homogeneous blend of coal from the various sloping contiguous bands 68 within the elongated slot bin storage 36. The blending aspects of the horizontal plow system will be discussed in more detail later.

Figure 6:
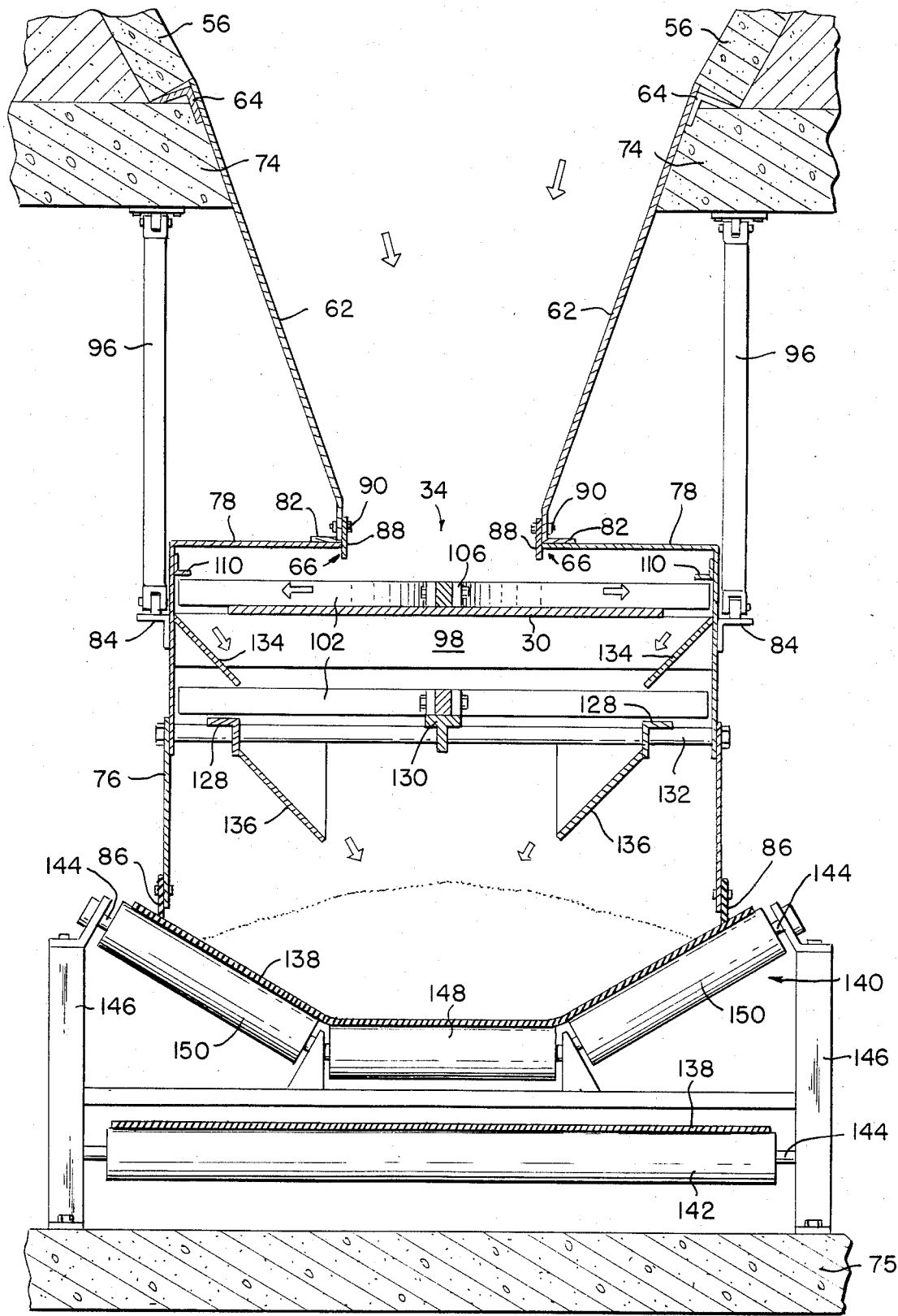
FIG. 6 is an enlarged end view of the horizontal plow system apparatus with large arrows showing the direction of the flow of coal from the elongated slot bin storage to then fall onto the planar surfaces where it is displaced laterally from the sides of the receiving stationary top plates, deflected and ultimately falling onto the moving transfer belt.
Figure 7:
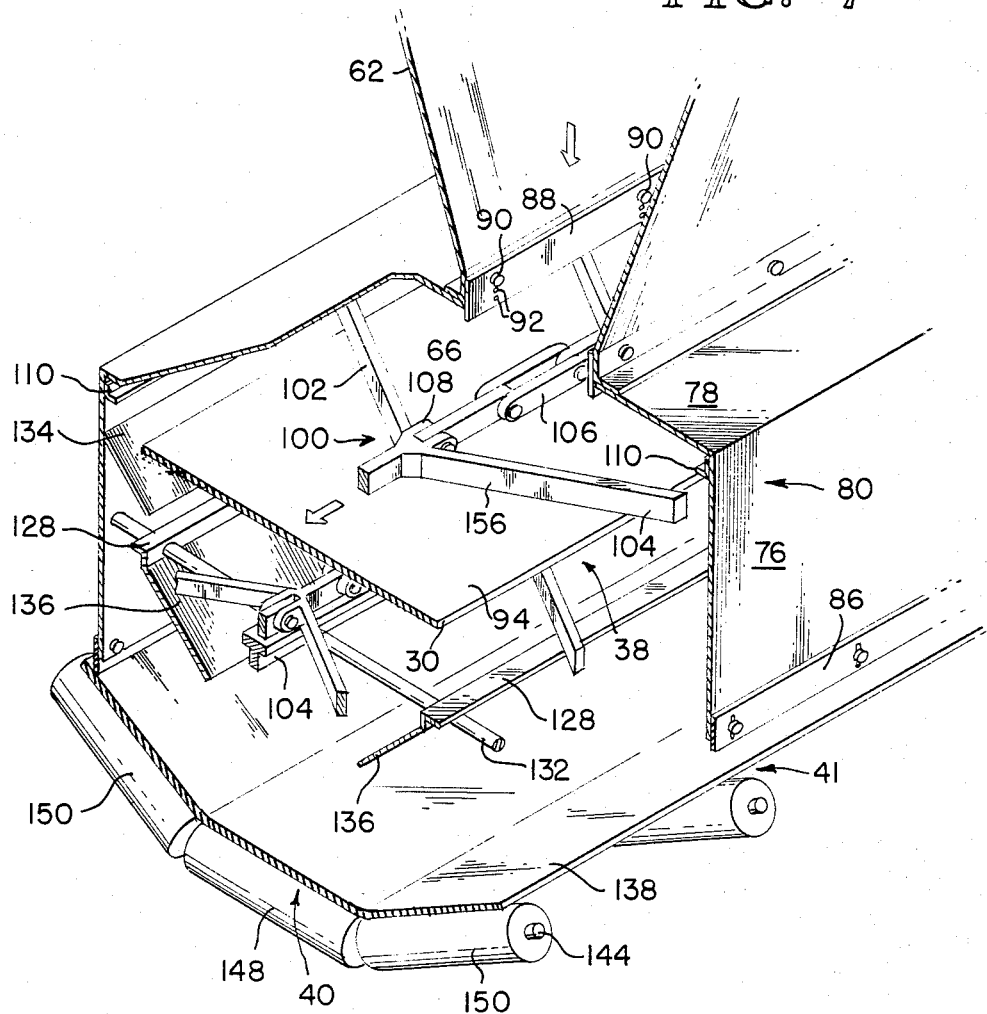
FIG. 7 is a perspective view of the horizontal plow system apparatus including the moving transfer belt with the sealing skirt structure broken away for clarity of detail.

The Sealing Skirt Structure Supports the Displacement Assemblies and the Moving Transfer Belt as Well as Providing Dust Control Within the Tunnel During the Reclaiming, Blending and Transfer Processes Referring to FIGS. 2, 6 and 7, side sealing skirts 76 and top sealing skirts 78 comprise a sealing skirt structure 80 located within the tunnel 70 which further partially encloses and supports the displacement assemblies 28 and transfer belt 40, providing dust control and containing the coal 22 during the reclaiming, blending and transfer processes.

As shown in FIGS. 6 and 7, the top sealing skirts 78 depend laterally from the bottom edges 66 of each side of the tapered gathering hopper 62, extending toward the vertical walls 72 of the tunnel 70 along the entire length of the longitudinal discharge opening 34. The top sealing skirts 78 are secured to the lower flanges 82 of the tapered gathering hopper 62.

Integrally connected to the top sealing skirts 78, the side sealing skirts 76 depend downwardly and vertically from the outside edges of the top sealing skirt 78. The side sealing skirts 76 extend the entire length of the longitudinal discharge opening 34 and are positioned adjacent to the outside edges 41 of the moving transfer belt 40 as shown in FIG. 6. Suspended just above the moving transfer belt 40, the side sealing skirts 76 have adjustable sealing strips 86 secured to their bottom sides to provide an extension of the bottom edge of the side sealing skirts 76 and substantially seal the moving transfer belt 40 within the sealing skirt structure 80 along its entire length to prevent dust and coal particles from being dispersed while the coal is being deposited onto and travels on the moving transfer belt 40. The sealing skirt structure 80 is additionally supported by a pair of support columns 96 which depend downwardly from the partial roof members 74 on the opposite sides of the tapered gathering hopper 62 and are secured to angle brackets 84 which are mounted on the outside of the side sealing skirts 80.

Adjustable Plates are Typically Used to Regulate the Flow of Coal Which Falls Through the Longitudinal Discharge Opening of the Elongated Slot Bin Storage Adjustable plates 88 are positioned in vertical alignment with the bottom of a longitudinal discharge opening 34 to regulate the amount of coal permitted to flow from the elongated slot bin storage 36 through the longitudinal discharge opening 34 prior to falling down onto the receiving stationary top plates 30 as shown in FIGS. 6 and 7. Extending longitudinally the entire length of the longitudinal discharge opening 34, the adjustable plates 88 are slidably secured with bolts 90 to the bottom edges 66 of the tapered gathering hopper 62, wherein vertically aligned slots 92 are spaced apart through the adjustable sealing strips 86, allowing the adjustable plates 88 to be raised or lowered as needed to control the flow of coal 22 which is permitted to fall onto the planar surfaces 94 of the receiving stationary top plates 30.

The Receiving Stationary Top Plate of the Displacement Assembly

Longitudinally aligned with and located beneath the longitudinal discharge opening 34, the receiving stationary top plate 30 provides a planar surface 94 of the displacement assembly 28 to receive and support the flow of coal 22 which has previously been deposited from the elongated slot bin storage 36. Where multiple displacement assemblies 28 are implemented, the receiving stationary top plates 30 are positioned end to end and spaced apart beneath the longitudinal discharge opening 34 along its entire length.

In the preferred embodiment, each of the receiving stationary top plates 30 have a substantially horizontal planar surface 94 which permit the retention of coal 22 on the receiving stationary top plates 30 when the horizontal flight subassemblies 32 are not moving, as well as facilitate a controlled flow of coal off of the sides 38 of the receiving stationary top plates 30 while the horizontal flight subassemblies 32 are in motion. However, the planar surface 94 may also be slightly angled, convexed or concaved for use with certain bulk solids.

The receiving stationary top plates 30 are supported underneath by cross members 98, vertically aligned members positioned transversely to and spaced apart beneath the receiving stationary top plates 30. The cross members 98, shown in FIGS. 5 and 6 are in turn secured at each end to the side sealing skirts 76, such as by welding.

The receiving stationary top plates 30 are centrally located beneath the longitudinal discharge opening 34 and each receiving stationary top plate 30 is adapted to support a horizontal flight subassembly 32.

The Horizontal Flight Subassembly of the Displacement Assembly

Figure 8:
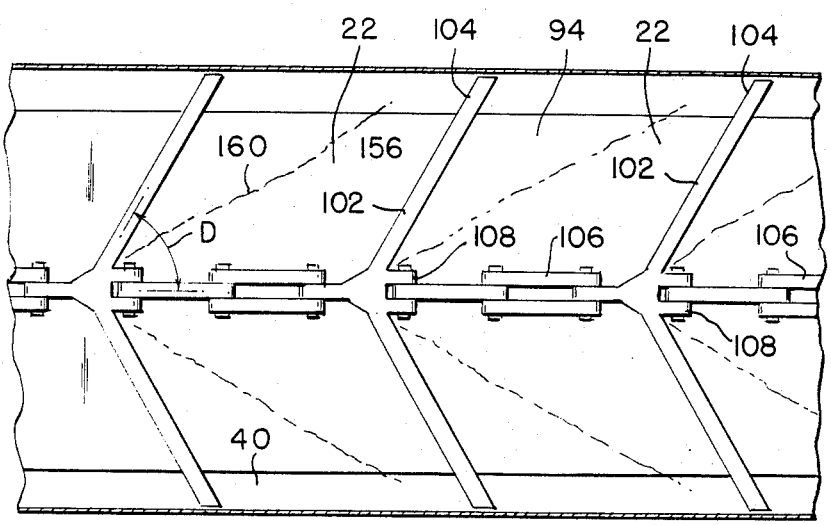
FIG. 8 is a top plan sectional view of the angular flights depending from the endless chain at angle D. The shear line indicates the slope on which the coal will slide upon itself as it is pushed on a bias by the angular flights.

As shown in FIGS. 7 and 8 of the drawings, the horizontal flight subassembly 32 essentially comprises an endless chain 100 having angular flights 102 which depend from the sides of and are spaced apart along the endless chain 100.

The horizontal flight subassembly 32 is adapted for travel along the receiving stationary top plate 30 whereby the angular flights 102 slidingly travel in one direction along the planar surface 94 during rotational end to end movement of the endless chain 100 about the receiving stationary top plate 30.

The horizontal flight subassembly 32 is centered on the receiving stationary top plate 30 whereby the endless chain 100 is preferably centrally located on the planar surface 94 where a greater concentration of coal will fall such that a greater accumulation of coal will be deposited near the point of attachment of the angular flights 102 to the endless chain 100, thereby reducing the load on the outboard ends 104 of the angular flights 102 during travel of the angular flights 102 and permitting an increased volume of coal 22 to be handled by the horizontal plow system apparatus 20.

While any of several typical industrial link chains or cables may be used to move the angular flights 102, the preferred embodiment as shown in FIGS. 7 through 10, is adapted for use with drop forge link chain having interconnecting linkage members 106 and forked members 108.

The angular flights 102 are attached to the opposite sides of the forked members 108 of the endless chain 100 and depend rearwardly from the point of attachment toward the sides 38 of the receiving stationary top plates 30 preferably at an angle of between 25 degrees and 65 degrees relative to the linear alignment and direction of travel of the endless chain 100, as shown in FIG. 8.

As the endless chain 100 moves about the ends of the receiving stationary top plate 30, the angular flights 102 slidingly scrape the planar surface 94 of the receiving stationary top plate 30, thereby imparting coexisting longitudinal and transverse horizontal forces upon the coal relative to the alignment and direction of travel of the endless chain 100, thereby pushing the coal on a bias, along the planar surface 94 during the longitudinal horizontal travel of the horizontal flight subassembly 32, and ultimately displacing the coal from the planar surface 94 off of the sides 38 of the receiving stationary top plate 30 to thereafter fall down onto the transfer belt 40 below. Arrows in FIG. 7 of the drawings indicate the direction of movement of the coal as it is pushed along the planar surface 94.

The outboard ends 104 of the angular flights 102 extend beyond the sides 38 of the receiving stationary top plate 30 to facilitate a more complete displacement of coal 22 from the planar surface 94 of the receiving stationary top plate 30, which will thereafter fall down onto the moving transfer belt 40.

Retaining brackets 110, shown in FIGS. 6 and 7, depend from the side sealing skirts 76, extending toward the center of the receiving stationary top plate 30 and positioned parallel to the planar surface 94 to limit vertical movement of the angular flights 102 during their travel along the planar surface 94. Extending longitudinally the length of the receiving stationary top plate 30, the retaining brackets 110 extend over the outboard ends 104 of the angular flights 102 to prevent upward movement of the angular flights 102 which may result from coal 22 becoming lodged on the planar surface 94 of the receiving stationary top plate 30.

A Variable Speed Drive Provides the Primary Means to Drive the Horizontal Flight Subassembly in the Displacement Assembly, With Respect to the End to End Rotational Movement of the Endless Chain About the Receiving Stationary Top Plate In the preferred embodiment, variable speed drive is the primary means for operating the horizontal flight subassembly 32. Preferably positioned above one end of the receiving stationary top plate 30, the variable speed drive 112 rotates a drive belt 114, or chain about a sheave 116 which is mounted on the end of a drive shaft 118 of the variable speed drive. The drive belt 114, in turn rotates a drive sprocket 120 which is positioned adjacent to the end of the receiving stationary top plate 30 as shown in FIGS. 4 and 5.

Upon completion of longitudinal travel by the horizontal flight subassembly 32 along the planar surface 94, the endless chain 100 rotates around the rotating drive sprocket 120 to then begin return travel beneath the receiving stationary top plate 30. An idler wheel 122, positioned adjacent to the opposite end of the receiving stationary top plate 30, rotatingly guides and supports the endless chain 100 of the horizontal flight subassembly 32 upon completing the return travel beneath the receiving stationary top plate 30.

Pyramid shaped covers 124, shown in FIGS. 3 and 4 partially enclose the drive means for each displacement assembly 28, including the rotating drive sprockets 120 and idler wheels 122 as shown in FIGS. 3 and 4. The pyramid shaped covers 124 have sloping sides 126 extending upward at an inclined angle from the bottom of the elongated slot bin storage 36 into the storage area which facilitates the flow of coal 22 from the elongated slot bin storage 36 through the longitudinal discharge opening 34 and prevents spillage of coal into the variable speed drives 112. Because of the flow characteristics of coal, the sloping sides 126 of the pyramidal shaped covers 124 are preferably positioned at approximately 60 degree angles relative to the horizontal plane. The pyramid shaped covers 124 must provide a sufficiently large enclosure to make room for the trajectory of the angular flights 102 as they rotate around the drive sprockets 120 and idler wheels 122 during end to end rotational movement of the horizontal flight subassemblies 32 about the receiving stationary top plates 30.

Wear Angles and a Wear Bar Support the Return Travel of the Horizontal Flight Subassembly of the Displacement Assembly During the return travel of the horizontal flight subassembly 32 below the receiving stationary top plate 30, the outboard ends 104 of the angular flights 102 are slidingly supported by wear angles 128, located beneath the angular flights 102 while the endless chain 100 is slidingly supported underneath by a centrally located wear bar 130.

As shown in FIGS. 6 and 7, the wear angles 128 are L-shaped members located beneath the cross members 98 and positioned in approximate vertical alignment with the outside edges of the receiving stationary top plate 30 and parallel to the travel of the endless chain 100. The wear angles 128 extend for the entire length of the receiving stationary top plate 30.

The wear bar 130 is a T-shaped member centrally located below the cross members 98 and positioned beneath the endless chain 100. The wear bar 130 extends in parallel alignment with the wear angles 128 for the entire length of the receiving stationary top plate 30 to slidingly support the endless chain 100 of the horizontal flight subassembly 32 during its return travel beneath the receiving stationary top plate 30.

The wear bar 130 and wear angles 128 are supported at each end beneath each end of the receiving stationary top plate 30 by a rod 132 which is positioned transversely to the receiving stationary top plate 30 and extends through the wear bar 130 and wear angles 128 as shown in FIGS. 6 and 7. Each rod 132 is in turn secured at each end to the side sealing skirts, such as with a bolt or by welding.

Pairs of Deflector Plates Guide the Flow of Coal, as it is Displaced From the Planar Surface Off of the Sides of the Receiving Stationary Top Plate, Toward the Center of the Moving Transfer Belt Pairs of deflector plates 134 and 136 are positioned beneath the receiving stationary top plate 30 of each displacement assembly 28, and each pair extends longitudinally the entire length of the receiving stationary top plate 30. Upper deflector plates 134 depend downwardly at an angle, from each of the sides of the side sealing skirts 76, the point of attachment of the upper deflector plates 134 to the side sealing skirt 76 being adjacent to the top edge of the cross members 98 as shown in FIG. 6. Supportively abutting the surfaces of both sides of the spaced apart cross members 98, the upper deflector plates 134 are angled inwardly from the side sealing skirts 76 to direct the flow of coal 22 toward the center of the moving transfer belt 40 as it is displaced from the sides 96 of the receiving stationary top plate 30.

Lower deflector plates 136 form depending extensions of the wear angles 128 and extend longitudinally for the entire length of the receiving stationary top plate 30. Positioned inboard of the upper deflector plates 134 and beneath the rod 132, the lower deflector plates 136 extend inwardly at substantially parallel angles to the upper deflector plates 134 to continue the flow of coal toward the center of the moving transfer belt 40 after it is deflected by the upper deflector plates 134.

A Moving Transfer Belt is Typically Used to Receive the Reclaimed Coal After Being Displaced Off of the Sides of the Receiving Stationary Top Plates Prior to Being Transferred to the Site of A Downstream Process at the Utility Plant After being displaced by the slidingly horizontal movement of the angular flights 102 from the planar surface 94 off of the sides 38 of the receiving stationary top plates 30 and deflected, as it falls, by the upper 134 and lower 136 deflector plates, the coal 22 falls down onto the moving transfer belt 40 whereby it is then received in progressively increasing layers during the homogenous blending process during longitudinal horizontal movement of the moving transfer belt 40. The now homogenously blended and layered coal 152 is then transported via the moving transfer belt 40 to the downstream process at the utility plant 24, for example, to provide fuel needed for the furnace 26.

Typically used to transport material reclaimed from storage to another location within the plant facility, the moving transfer belt 40 is centrally positioned beneath the receiving stationary top plates 30 and in parallel alignment with the longitudinal discharge opening 34, extending the entire length of the elongated slot bin storage 36 and then continuing to extend to the site of the downstream process.

In the preferred embodiment, as illustrated in FIGS. 5, 6 and 7, the moving transfer belt 40 typically comprises an endless belt 138 which is supported for longitudinal, horizontal movement about transport rollers 140 and return rollers 142, such rollers being spaced apart along the entire length of the endless belt 138. The transport rollers 140 and return rollers 142 are securely supported by pairs of upright support members 146 spaced apart along the endless belt 138, wherein a shaft 144 extends through the centers of both the transport 140 and return 142 rollers and is attached at each end to the upright support members 146. The upright support members 146 are positioned at the base 75 of the tunnel beneath and adjacent to the outside of the side sealing skirts 76 as shown in FIG. 6.

The transport rollers 140, adapted for use with the preferred embodiment, comprise three separate rollers aligned end to end transverse to and along the entire length of the endless belt 138 including a central transport roller 148 and two side transport rollers 150. The side transport rollers 150 are positioned at a slight angle giving the moving transfer belt 40 a slightly concave shape to better contain the coal as it is transported in the now homogenously blended form to the downstream process.

The return rollers 142 are positioned underneath the transport rollers, transversely to and spaced apart along the entire length of the endless belt 138 to provide a supportive means for return travel of the moving transfer belt 40. Typically, a fixed speed drive may be used to move the moving transfer belt 40.

The Horizontal Plow System in Operation; Tracing the Flow of Coal From Storage to the Displacement Assemblies and Thereafter to the Moving Transfer Belt The slidable movement of the angular flights 102 along the planar surface 94 during the end to end rotational travel of the horizontal flight subassemblies 32 about the receiving stationary top plates 30 causes displacement of the coal 22, which was previously deposited from the elongated slot bin storage 36, from the planar surface 94 and off of the sides 38 of the receiving stationary top plates 30, thereby allowing portions of the remaining stored coal to continuously flow through the longitudinal discharge opening 34 of the elongated slot bin storage 36 and then fall onto the planar surfae 94, during the reclaiming process. Travel of the angular flights 102 also provides the means, via displacement, for homogenously blending the coal from the various contiguous bands 68 in the elongated slot bin storage 36. After being displaced from the planar surface 94 of each of the receiving stationary top plates 30, and along their entire length, simultaneously, the coal 22 falls down onto the moving transfer belt 40, and accumulates in progressively increasing layers, during longitudinal horizontal movement, resulting in a homogenously blended coal 152 which thereafter is transported via the moving transfer belt 40 to the downstream process at the utility plant 24.

While being deposited into elongated slot bin storage 36, the coal 22 differing in physical and chemical composition, is stacked and contained in generally sloping contiguous bands 68 or mounds.

A plurality of displacement assemblies 28 positioned beneath the elongated slot bin storage 36 provides for optimal reclaim and blending capabilities by permitting portions of the coal 22 to be reclaimed and eventually homogenously blended from each of a large number of car lots simultaneously along the entire length of the elongated slot bin storage 36.

Upon being deposited, portions of coal are permitted to flow, via gravitational forces, through the longitudinal discharge opening 34, to thereafter fall down onto the planar surfaces 94 of each of the receiving stationary top plates 30 of the displacement assemblies 28 simultaneously.

As previously discussed, while the horizontal flight subassemblies 32 remain motionless, the flow of coal 22 from the elongated slot bin storage 36 onto the planar surfaces 94 is stopped. The width as well as the spacing of the receiving stationary top plates 30, relative to the longitudinal discharge opening 34, are determined by, for example, the angle of repose of the coal which allows the coal 22 to be retained on the planar surfaces 94 of the receiving stationary top plates 30, which thus act as a valve or gate for the longitudinal discharge opening during the periods of non operation of the horizontal flight subassemblies 32.

When the coal is demanded from storage, the horizontal flight subassemblies 32 of the displacement assemblies 28 are operated, being driven by the variable speed drives 112. As the endless chains 100 begin traveling along the planar surfaces 94 of the receiving stationary top plates 30, the coal 22 is reactively moved on a bias from the longitudinal horizontal movement of the horizontal flight subassemblies 32 via concurrent longitudinal and transverse forces imparted by the angular flights 102, simultaneously along the entire length of each of the receiving stationary top plates 30. In turn, portions of the remaining stored coal 22 from the elongated slot bin storage 36 continue to flow through the longitudinal discharge opening 34 thereafter to fall down onto the planar surfaces 94 of the receiving stationary top plates 30 during the longitudinal travel of the horizontal flight subassemblies 32 to then replace the coal which has been displaced. This process is continuously repeated while the horizontal plow system 20 is in operation, whereby the coal, from each of the various car lots and having various chemical and physical properties, is simultaneously deposited onto the planar surfaces 94 to then be displaced from the planar surfaces 94 and the sides 38 of the receiving stationary top plates 30. The independent speed controls permit the horizontal flight subassemblies 32 to be operated singly or in combination with each other to permit either selective reclaiming and blending from particular sections, i.e. specific car lots, of the elongated slot bin storage 36 or from along the entire length of the elongated slot bin storage 36 simultaneously.

During operation of the horizontal plow system 20, the moving transfer belt 40 travels longitudinally beneath the receiving stationary top plates 30 to continuously receive the coal 22 which has fallen down off of the sides 38 of the receiving stationary top plates 30 after being displaced by the horizontal flight subassemblies 32. The moving transfer belt 40 then continues moving to a discharge location 154, transporting the now homogenously blended and layered coal 152 to now be used in a downstream process, such as providing fuel for the furnace 26 at the utility plant 24.

Continuous and Simultaneous Reclaiming and Homogenous Blending of the Coal, Achieved by the Horizontal Plow System, is a Function of the Cooperational Movement of the Horizontal Flight Subassemblies With the Transfer Belt Operation of the horizontal plow system apparatus 20 permits the coal, once displaced from the planar surfaces 94, to fall down onto the upper 132 and then lower 134 deflector plates and eventually fall onto the moving transfer belt 40 while the moving transfer belt 40 is stationary as well. The longitudinal horizontal travel of the moving transfer belt 40, however, in combination with the sliding movement of the horizontal flight subassemblies 32 permits the homogenous blending and layering of the coal from each of the sloping contiguous bands 68 along the entire length of the elongated slot bin storage 86.

At any one time, while all displacement assemblies 28 are in operation, coal 22 is being displaced from the planar surfaces 94 of the receiving stationary top plates 30 along the entire length of the elongated slot bin storage 36. During longitudinal horizontal travel, the moving transfer belt 40 accumulates the coal in progressively increasing layers such that any area of the moving transfer belt 40, upon completion of the distance traveled between one end of the longitudinal discharge opening 24 and the opposite end of the longitudinal discharge opening 24, now contains layers of homogenously blended and layered coal 152 from each of he sloping contiguous bands 68 within the elongated slot bin storage 36 as shown in FIG. 3.

Referring further to FIG. 3 of the drawings, point A and point B represent the beginning and ending locations respectively with regard to the longitudinal, horizontal travel of the moving transfer belt 40 beneath the receiving stationary top plates 30 as it receives the displaced coal 22. As the moving transfer belt 40 first begins to move, it will receive and contain coal from less than all the contiguous bands 68 until it has completed traveling the entire distance from point A to point B. Thereafter, the transfer belt 40 will contain layers of now homogenously blended and layered coal 152 from each of the displacement assemblies 28 that were in operational use during longitudinal horizontal travel of the moving transfer belt 40. As previously indicated, independent operating speed controls permit individual horizontal flight subassemblies 32 of the displacement assemblies 28 to remain stationary during the operation of the horizontal plow system apparatus 20. The variable speed drives 112 also permit individual horizontal flight subassemblies 32 to travel faster, displacing a greater volume of coal, or slower, displacing a lesser volume of coal, from the sides 38 of the receiving stationary top plates 30 during operation of the horizontal plow system apparatus 20, thereby changing the composition of the reclaimed now homogenously blended and layered coal 152 prior to being transported by the moving transfer belt 40 to the downstream process. The variable and independent operating controls thus permit the total volume as well as the proper homogenous blend of the coal to be established to meet the requirements of the utility plant 24, for example, to be used as fuel for the furnace 26.

Figure 9:
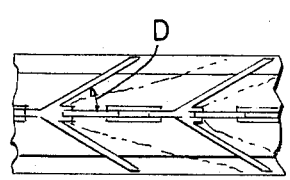
FIG. 9 is a top plan schematic view wherein angle D is smaller, minimizing carryover of coal to the end of the receiving stationary top plate and permitting the angular flights to be spaced closer together.

The Angular Pitch and Spacing of the Angular Flights is Established so as to Facilitate the Required Displacement of Coal Off of the Sides of the Receiving Stationary Top Plates and Minimize Carryover of Coal to the Ends of the Receiving Stationary Top Plates The angle between the endless chain 100 and the attached angular flights 102, indicated by angle D in FIGS. 8 and 9 of the drawings, will be determined by, among other factors, the flow characteristics of the solid particulate material being reclaimed and homogenously blended. While the angle at which the angular flights 102 depend away from the endless chain 100 will vary with different bulk solids and even with different samples and grades of coal, the homogenous blending is achieved when the bulk solid is displaced continuously from the sides 38 of the receiving stationary top plates 30 rather than carried to the end of the planar surfaces 94 to fall en masse onto the moving transfer belt 40.

Angle D is approximately 60 degrees from the endless chain 100 and is preferable, as such, to permit most grades of coal to be pushed on a bias on the planar surfaces 94 during travel of the angular flights 102, and eventually be displaced off of the sides 38 of the receiving stationary top plates 30 rather than be carried over to fall off of the end 158 of the receiving stationary top plate 30.

Figure 10:
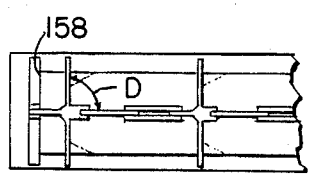
FIG. 10 is a top plan sectional schematic view illustrating perpendicularly positioned angular flights, resulting in a large amount of carryover of coal, which is so illustrated to show what is not wanted, and to therefore indicate why the angular flights are not arranged perpendicularly.

As illustrated in FIG. 10 of the drawings, the angular flights 102 are positioned normally to the endless chain 100 whereby as used with coal, a large amount of "carryover" results. Some bulk solids may, however, be displaced from the sides 38 via angular flights positioned at or near 90 degrees to the endless chain 100.

In the Method of Reclaiming and Homogenously Blending the Coal, Angle A Affects the Theoretical Allowable Distance Between Angular Flights Which in Turn Affects the Capacity and Flowability of the Horizontal Plow System As a result of being pushed by the angular flights 102, a frictional load is applied to the coal 22 during movement along the planar surfaces 94, causing the coal to slide upon itself on a bias along a shear line 160 as it is pushed. The angle of the shear line 160, measured from the endless chain 100 to the line upon which the coal is sliding upon itself, will be determined by several factors, including the pitch of the angular flights 102 and the flow characteristics of the bulk solid particulate matter, i.e. the coal.

To allow substantially all of the coal particles which have fallen onto the planar surfaces 94 to be displaced off of the sides 38 of the receiving stationary top plates 30, the shear line 160, which forms between the angular flights 102, must intercept the endless chain 100 before it intercepts the preceding angular flight 102. In other words, when the angular flights 102 are spaced apart for optimal reclaiming and displacement capacity during operation of the horizontal plow system apparatus 20, the shear line 160 will extend from the outside edge of the receiving stationary top plate 30, adjacent to the outboard ends 104 of one angular flight 102, to intercept the endless chain 100 just behind the point of attachment of the preceding angular flight 102 to the endless chain 100, as shown in FIGS. 8 and 9 of the drawings.

While the pitch of the angular flights, i.e. angle D in FIGS. 8 and 9, will vary according to flow characteristics and utility plant requirements, the range will generally be between 25 degrees to 65 degrees as measured from the endless chain 100. As illustrated in FIG. 9, angle D is smaller whereby the angular flights 102 will carry very little coal longitudinally to the end of the planar surface 94 in comparison with the perpendicularly positioned angular flights shown in FIG. 10. With less carry over, the shear line 160 will be closer to the face 156 of the angular flight and intercept the endless chain 100 within a shorter spatial distance between angular flights 102. As a result, the angular flights may be spaced closer together. The advantage, them, to the angular flights being pitched is to allow for more angular flights, per lineal foot of the endless chain 100 which in turn will allow for increased volume of coal to be displaced from the planar surfaces 94 per linear foot of travel.

An Alternative Embodiment of the Horizontal Plow System May be Adapted for Use With Grain or Other Flowable Particulate Matter While the preferred embodiment is used for coal handling and reclaiming, the horizontal plow system may be adapted for use with grain or other solid flowable particulate matter. The configuration and size of elongated slot bin storage 36 may vary according to the volume as well as the physical characteristics of the solid particulate material being reclaimed and homogeneously blended during the reclaiming and transfer processes in the operation of the horizontal plow system apparatus 20. The angular pitch of the sloping and converging walls 56 may be modified to meet the flow characteristics of the solid flowable particulate matter and may be increased or decreased depending upon the required width of the longitudinal discharge opening 34.

The pitch of the angular flights 102 in the horizontal flight subassemblies 32 may also be varied according to the flow characteristics of the solid particulate flowable material. While the angular flights 102 are generally welded or otherwise permanently secured to the sides of the forked members 108 at the required angular position, an alternative embodiment of the horizontal plow system 20 may include an endless chain which has adjustable angular flights wherein the pitch may be adjustably modified.

I claim:

1. A horizontal plow system apparatus for the reclaiming and homogenous blending of solid flowable particulate matter, such as coal, adapted to be positioned under a live storage facility having an opening at the bottom, and over a moving conveying means, comprising a displacement assembly, which in turn is comprised of:
   (a) a receiving stationary top plate to be arranged in alignment with and beneath the opening of the live storage facility to receive the flow of coal which falls down onto the receiving stationary top plate via gravitational forces from the live storage facility; and
   (b) a horizontal flight subassembly, supportively adapted for slidable travel on top of the receiving stationary top plate to continuously and simultaneously displace coal, which was previously deposited from the live storage facility from the sides of the receiving stationary top plate upon demand, during rotational end to end movement about said receiving stationary top plate, whereby the coal thereafter falls down onto the moving conveying means, to then be transported to the site of a downstream process at a plant facility.

2. A horizontal plow system method and apparatus as defined in claim 1 wherein the horizontal flight subassembly further comprises:
   (a) an endless chain comprising interconnected linkage members and forked members, which is supportively adapted for rotational end to end travel about the receiving stationary top plate; and
   (b) angular flights, spaced apart along the endless chain and depending from the opposite sides of the forked members and extending away from the endless chain at an angle.

3. A horizontal plow system apparatus as defined in claim 2 wherein the displacement assembly further comprises:
   (a) a variable speed drive used to rotate the endless chain about the receiving stationary top plate upon demand; and
   (b) a supportive sealing skirt structure centrally located beneath the live storage facility, comprising side sealing skirts and top sealing skirts, wherein the side sealing skirts are adapted to horizontally support the displacement assembly, while the top sealing skirt structure provides a partial enclosure for the displacement assembly and conveying means.

4. A horizontal plow system apparatus as defined in claim 3 wherein a live storage facility further comprises an elongated slot bin storage, having a lower longitudinal discharge opening, beneath which the moving conveying means, further comprising a moving transfer belt, is centrally located.

5. A horizontal plow system apparatus as defined in claim 4, whereby the angular flights further comprise facings and depend rearwardly from the opposite sides of the forked members at an angle which causes the bulk solid material to slide along said facing of the angular flight and slide upon itself on a bias relative to the longitudinal travel of the horizontal flight subassembly during said longitudinal travel of the horizontal flight subassembly, the angle between the endless chain and the attached angular flights being less than 45 degrees and specifically set to the characteristics of the bulk solid material, thereby maximizing biased displacement from the sides of the stationary top plate and minimizing bulk solid material carryover at the ends of the receiving stationary top plate.

6. A horizontal plow system apparatus as defined in claim 5 whereby the travel of the horizontal flight subassembly during operation of the horizontal flow system apparatus, simultaneously and continuously displaces bulk solid particulate material from the entire length of the sides of the receiving stationary top plates, said bulk solid particulate matter being previously reclaimed continuously and simultaneously from the entire length of the elongated slot bin storage facility and then deposited onto said receiving stationary top plates, to thereafter continuously accumulate on the moving transfer belt below, said operation of the horizontal plow system apparatus thereby reclaiming and blending portions of the bulk solid particulate matter from the entire length of the elongated slot bin storage at any one time.

7. A horizontal plow system apparatus as defined in claim 6 whereby the angular flights are spaced apart along the endless chain at a distance, determined by the frictional and flowability characteristics of the particular bulk solid, in which a shear line, comprising a slope or angular line along which the bulk solid particles slide upon themselves while being pushed along the receiving stationary top plate on a bias by the angular flights, extends from the outside edge of the receiving stationary top plate at each angular flight to intercept the endless chain prior to intercepting the preceding angular flight during sliding movement of the angular flights thereby allowing all particles of the bulk solid material to be completely and progressively displaced from the sides rather before being transported and carried over the end of the receiving stationary top plate.

8. A horizontal plow system apparatus as defined in claim 7 in which the linear spacing of the angular flights along the endless chain is based on a direct relationship between the distance between the angular flights and their angle away from the endless chain whereby as the angle at which the angular flights depend away from the endless chain is increased, the distance between the angular flights increases along the endless chain so as to provide displacement of substantially all of the coal from the sides of the receiving stationary top plate.

9. A horizontal plow system apparatus as defined in claim 8 which comprises a plurality of displacement assemblies, independently controlled, and which extend beneath the entire length of the longitudinal discharge opening to selectively reclaim and homogenously blend coal from within each of various segments of the elongated slot bin storage, wherein the receiving stationary top plates of each of the displacement assemblies are substantially horizontal positioned and spaced apart end to end centrally located beneath the longitudinal discharge opening.

10. In combination with a facility, having a lower opening, for the storage of a bulk solid particular matter, such as coal, having different chemical and physical properties, and a means for transferring ultimately reclaimed and homogenously blended coal to the site of a downstream process at a utility plant, a horizontal plow system apparatus for reclaiming and homogenously blending bulk solid particulate matter, comprising:
 (a) one or more receiving stationary top plates, positioned end to end beneath and in substantial alignment with the lower central opening, each receiving stationary top plate having a substantially horizontal planar surface to receive and support coal which flows from the storage facility and being adapted to support a horizontal flight subassembly; and
 (b) one or more horizontal flight subassemblies, each adaptively supported for slidable travel on top of a receiving stationary top plate during longitudinal rotational movement about the receiving stationary top plate and further adapted, during such movement, to continuously displace coal which was previously deposited from the storage facility, from the sides of the receiving stationary top plate upon continuing demand along substantially its entire length simultaneously, the coal thereafter falling down onto the transfer means to be ultimately transferred to the site of the downstream process.

11. A horizontal plow system method for the reclaiming and homogenous blending of solid flowable particulate matter, such as coal, at a utility or plant site, wherein the coal having various chemical and physical properties is stored in an elongated slot bin storage facility having a longitudinal discharge opening which upon being homogenously blended and reclaimed, will be transferred, via a moving transfer belt to the side of a downstream process at the utility plant, wherein the method comprises:
 (a) the flowing of coal via gravitational forces from the elongated bin storage through the longitudinal discharge opening to then fall onto a receiving stationary top plate of a displacement assembly whereby the receiving stationary top plate receives and supports the coal on a planar surface;
 (b) upon continuing demand, the longitudinal horizontal travel of a plurality of angular flights, comprising a horizontal flight subassembly, which thereby push the coal, previously fallen from the elongated slot bin storage, along the planar surface off of the sides of the receiving stationary top plate during rotational end to end movement about the receiving stationary top plate; and
 (c) the receiving and accumulation of coal, previously having fallen from the receiving stationary top plate, onto the moving transfer belt during longitudinal, horizontal travel of the moving transfer belt beneath the receiving stationary top plate, whereby the now homogenously blended and reclaimed coal is thereafter transferred to the site of the downstream process.

12. A horizontal plow system method as defined in claim 11 wherein the coal, upon being deposited into the elongated slot bin storage, settles into generally sloping contiguous bands within the elongated slot bin storage, thereafter portions of coal from each of the contiguous bands fall via gravitational forces through the longitudinal discharge opening onto the entire length of the receiving stationary top plate simultaneously.

13. A horizontal plot system method as defined in claim 12 wherein while the angular flights of the horizontal flight subassembly remain stationary, the previously fallen coal is retained on the planar surface, thus restricting further flow of coal from the elongated slot bin storage, whereby the receiving stationary top plate functions as a valve for the elongated slot bin storage during times of non operational use and whereas during operation of the horizontal flight subassembly, displacement of the previously fallen coal from the planar surface permits a continuous flow of coal yet contained in the elongated slot bin storage to thereafter fall down onto the receiving stationary top plate to then be displaced.

14. A horizontal plow system method, as defined in claim 13 wherein, after falling from the elongated slot bin storage onto the planar surface, the coal is then pushed on a bias via simultaneous longitudinal and transverse forces imparted by the angular flights, along the planar surface whereby it is then displaced off of the sides of the receiving stationary top plate continuously and simultaneously along the entire length of the receiving stationary top plate.

15. A horizontal plow system method as defined in claim 14, wherein while being pushed by the angular flights longitudinally along the planar surface, substantially all of the coal will continue to slide upon itself on a bias along a shear line and eventually be displaced from the planar surface, leaving substantially no coal to be pushed off of the end of the receiving stationary top plate.

16. A horizontal plow system method, as defined in claim 15 in which the coal, having previously been displaced, upon continuing demand from the planar surface, then falls down off of both sides of the receiving stationary top plate continuously and simultaneously along its entire length during sliding travel of the angular flights, to then fall down onto the moving transfer belt which is adapted for longitudinal horizontal movement, whereby during travel beneath the receiving stationary top plate, the moving transfer belt accumulates the continually falling coal, in progressively increasing layers prior to transferring the now homogeneously blended and layered coal to the site of the downstream process.

17. A horizontal plow system method, as defined in claim 16 wherein coal, previously deposited into the elongated slot bin storage, is permitted to fall down, via gravitational forces through the longitudinal discharge opening, onto a plurality of receiving stationary top plates simultaneously along the entire length of the elongated slot bin storage to thereafter be displaced from the planar surface of each receiving stationary top plate by an independently controlled horizontal flight subassembly, the displaced coal then falling from the sides of the receiving stationary top plates simultaneously down onto the moving transfer belt, whereby coal from the entire length of the elongated slot bin storage is thus permitted to be simultaneously homogenously blended via a plurality of displacement assemblies.

18. A horizontal plow system method as defined in claim 17 involving the simultaneous operation of inline displacement assemblies and the moving transfer belt wherein:
    (a) the receiving stationary top plates of each displacement assembly receive coal of each of the contiguous bands from the above elongated slot bin storage; and
    (b) sliding longitudinal travel of the angular flights of each horizontal flight subassembly push the coal on a bias along the planar surface of each receiving stationary top plate, with respect to the continuously operating horizontal flight subassemblies, and ultimately displace the coal from the receiving stationary top plates onto the continuously operating moving transfer belt; and
    (c) receiving the coal from the receiving stationary top plates by the continuously operating moving transfer belt in respective progressively increasing layers and thereafter delivering the now homogenously blended and layered coal, via the moving transfer belt, to the site of a downstream selected process.

19. A horizontal plow system method as defined in claim 18, wherein upon initial operation and longitudinal horizontal travel, the moving transfer belt receives coal in respective layers from less than the entire length of the elongated slot bin storage whereas during longitudnal horizontal travel beneath the entire length of the elongated slot bin storage the moving transfer belt receives coal in respective progressively increasing layers from each of the contiguous bands of coal within the elongated slot bin storage which, upon completion of said travel comprises homogenously blended and layered coal to now be transferred via the moving transfer belt to the site of the downstream process.

* * * * *